United States Patent [19]

Maue et al.

[11] Patent Number: 4,896,084
[45] Date of Patent: Jan. 23, 1990

[54] SINGLE INPUT, SINGLE SUPPLY THREE-STATE CONTROLLER

[75] Inventors: H. Winston Maue, Farmington Hills; Timothy S. Roddy, Canton, both of Mich.

[73] Assignee: United Technologies Automotive, Inc., Dearborn, Mich.

[21] Appl. No.: 355,254

[22] Filed: May 22, 1989

[51] Int. Cl.⁴ .............................. H02P 1/22; H02P 3/12
[52] U.S. Cl. .................................... 318/280; 318/256; 318/273; 318/293; 318/443
[58] Field of Search ............... 318/256, 273, 280, 281, 318/286, 287, 291, 293, 294, 443, 444, 466

[56] References Cited

U.S. PATENT DOCUMENTS

| | | | |
|---|---|---|---|
| 1,732,711 | 10/1929 | Boddie | 318/293 X |
| 2,875,391 | 2/1959 | Brannan | 318/293 |
| 3,290,575 | 12/1966 | Modiano | 318/293 X |
| 3,305,718 | 2/1967 | Waldron | 318/293 X |
| 4,020,361 | 4/1977 | Suelzle et al. | 318/599 X |
| 4,020,403 | 4/1977 | Means | 318/293 X |
| 4,288,726 | 9/1981 | Vazquez-Cuervo et al. | 318/54 |
| 4,394,605 | 7/1983 | Terazawa | 318/256 X |
| 4,677,356 | 6/1987 | Tsuneda et al. | 318/293 X |

Primary Examiner—Bentsu Ro

[57] ABSTRACT

A circuit for controlling three modes of operation of a multiple terminal load using a single positive DC voltage 12, simple circuitry, two relays 26, 30 and a single input control line 17. The circuit senses a switch 16, or logic device generating three conditions: open circuit, connection to positive voltage or connection to ground. Three operating modes are effected while minimizing the number of wires needed to control the multiple terminal load.

15 Claims, 2 Drawing Sheets

| SWITCH | 26 | 30 |
|---|---|---|
| +V CW | N.O. | N.C. |
| OPEN BRK | N.C. | N.C. |
| GND CCW | N.C. | N.O. |

| SWITCH | 26 | 30 |
|---|---|---|
| +V HIGH | N.O. | N.O. |
| OPEN LOW | N.C. | N.O. |
| GND OFF | N.C. | N.C. |

FIG. 5
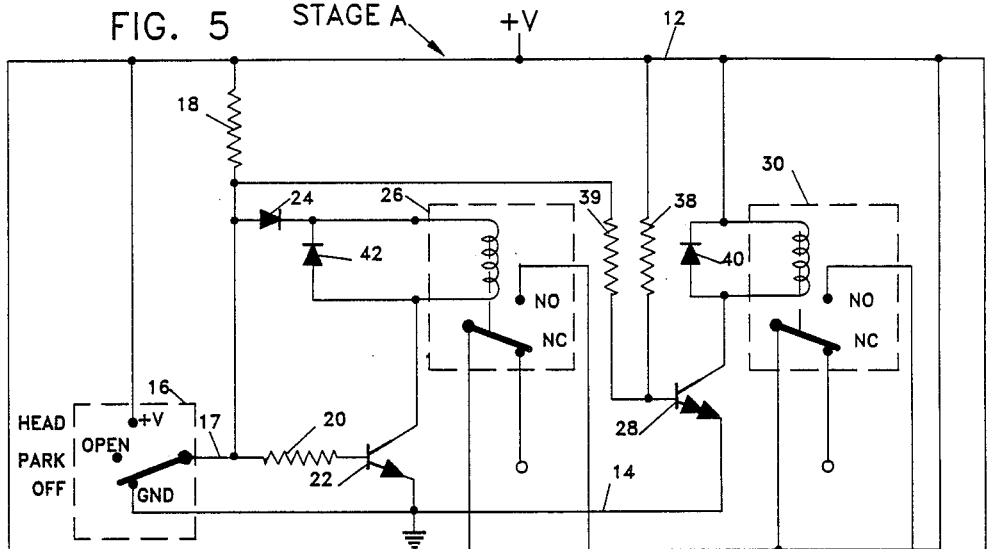
FIG. 5A
| SWITCH | | 26 | 30 |
|---|---|---|---|
| +V | B HL | N.O. | N.O. |
| OPEN | PK | N.C. | N.O. |
| GND | OFF | N.C. | N.C. |
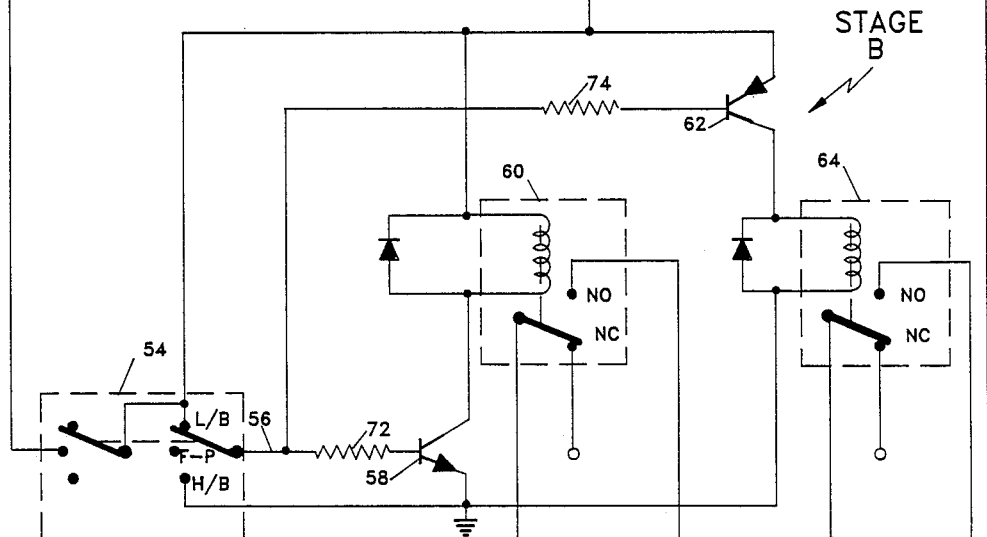
FIG. 5B
| SWITCH | | 60 | 64 |
|---|---|---|---|
| +V | LB | N.O. | N.C. |
| OPEN | F-P | N.O. | N.O. |
| GND | HI | N.C. | N.O. |

SINGLE INPUT, SINGLE SUPPLY THREE-STATE CONTROLLER

TECHNICAL FIELD

This invention relates to a control circuit, particularly to a circuit for controlling three states of operation of a load using a single control line and a single power supply.

BACKGROUND ART

Automotive accessories and light industrial controls often incorporate small, reversible, two terminal DC motors and other loads, which must be controlled from locations some distance away from the load. In these applications it is desirable to control load operation relatively simply and inexpensively, using minimal parts and keeping the quantity of wires running to the load to a minimum.

In automotive applications it is especially critical that the quantity and size of wires run, be kept to a minimum. Typically, the wires distributed to control various loads in locations throughout an automobile are "bundled" and distributed in "wire harnesses." The proliferation of electrically controlled automotive options has resulted in wire harness bundles of considerable magnitude. Because of the need to package wire harnesses in vehicles, out of the view of vehicle occupants, serious consideration is given to reducing bundle sizes.

In order to package wire harnesses in the infrastructure of a vehicle, they are typically installed early in the auto assembly process. Manufacturers may install wires in wire harnesses which distribute wires throughout a vehicle for options that are not installed in all vehicles by the manufacturer at the time of assembly. These "give-away wires" facilitate the installation of options and reduce the number of different wire harness types required. Wire harnesses with give-away wires benefit manufacturers by providing flexibility to install accessories. However manufacturers desire to minimize give-away wires in order to reduce product cost.

Control of accessory loads, such as two terminal reversible DC motors used to actuate power windows, power door locks, power seats, power mirrors or the like, normally involves running at least two power wires and multiple control lines to the two terminal reversible motors and related circuitry. The wires facilitate motor operation in a forward or clockwise mode by directing current flow to a positive motor terminal and in a reverse or counterclockwise mode by directing current flow to a negative motor terminal. A third mode that is often desirable, dynamic braking, may be obtained by shorting the positive and negative motor terminals together.

Several methods of providing three-state motor control (forward or clockwise rotation, reverse or counterclockwise rotation and dynamic braking), for two terminal motors exist. A direct high-current control method involves switching a source voltage at a complex high current switch and delivering current to one motor terminal or the other via two high-current wires. System expansion, by adding additional motors, requires one additional high-current switch and two additional high-current wires for each added motor. The complex switching and multiple high-current wires running to the motors present drawbacks in this method, especially when additional switches are desired to control the same motor from several locations. For instance, controlling a power window motor from the drivers door and a remote door in which the window resides, with this method, would require two high-current switches and four high-current wires for the one motor.

Simple low-current switching can be used by controlling relays to effect three-state motor control. This method, embodied in U. S. Pat No. 4,288,726 improves on the direct high-current control method by eliminating the need for complex high-current switches. Three high-current wires are used to provide power to several motors. Only one relay per motor is required. System expansion by adding new motors requires only a low-current switch and one relay for each motor added, however, a serious limitation in simultaneous motor operation exists in this method, in that any motor selected must simultaneously be commanded to rotate in the same direction.

A relatively sophisticated electronic communication method uses only one pair of high-current wires to power several motors. Electronic encoder/decoder circuitry facilitates relay selection. Only a single low-current switch and one relay needs to be added for each motor added to expand the system, however, the reduction in wires run may not justify the expense of the electronics needed to encode and decode serial communication signals. Similarly, a failure in the communication line or in the encoding and decoding electronics may disable the entire system.

Various, similar multi-wire switching control configurations also exist for controlling non-motor loads requiring three-states of operation. As with motor loads, other DC loads such as lighting circuits, normally require at least two power wires and multiple control lines.

DISCLOSURE OF THE INVENTION

Objects of the invention include reducing complexity of control circuitry and the number of control lines and power supply lines necessary to effect two directions of motor rotation and dynamic braking of a two terminal reversible DC motor.

Additional objects of the invention include reducing the complexity of control circuitry and the number of control lines and power supply lines needed to control three-state operation of non-motor loads, such as lighting circuitry.

According to the invention, simple circuitry having a single input control line is configured to provide three modes of operation of a multi-terminal load.

In further accord with the invention, a single DC voltage source powers a load and a circuit capable of distinguishing three different signal conditions on a single input control line, making it possible to direct electric current flow to control three modes of operation using simple circuitry, only three wires and a single power supply.

Features of the invention include: facilitating automotive option expandability by including only a single low current give-away wire per option in prefabricated wiring harnesses; reducing wiring harness bundle size; and providing for use of non-complex, low-current switching or tri-state logic to effect three input signal conditions (positive voltage, ground, or open circuit), on the single input control line. Additionally, dynamic braking of a motor is provided for in an embodiment configured for three-state operation of two terminal DC motors.

BRIEF DESCRIPTION OF THE DRAWINGS

FIG. 5 is an alternative embodiment, for controlling automotive lighting by cascading circuits designed according to the invention;

FIG. 5A is a table correlating input control line condition and circuit operation of a stage A of the cascaded circuit of FIG. 5; and FIG. 5B is a table correlating input control line condition and circuit operation of a stage B of the cascaded circuit of FIG. 5.

BEST MODE FOR CARRYING OUT THE INVENTION

Figure 1:
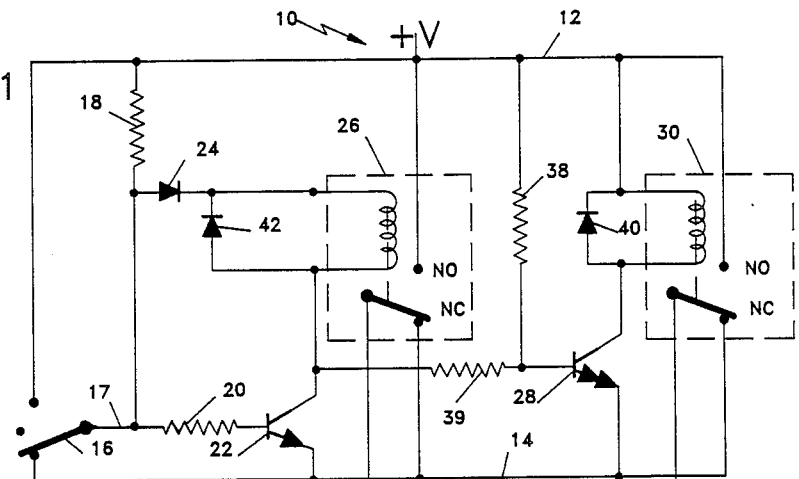
FIG. 1 is a schematic diagram of a single input, single supply three-state motor control circuit.
Figure 2:
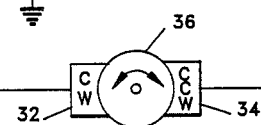
FIG. 2 is a table correlating input control line condition and circuit operation of the motor control circuit of FIG. 1.

Referring now to FIGS. 1 and 2, a three-state motor control circuit 10 is powered by a single supply, positive voltage on a line 12, in the range of +9 volts DC to +16 volts DC (typically +12 volts DC), with respect to a reference or ground on a line 14. A three position switch 16 or logic device capable of providing alternatively three circuit conditions, is connected to a single input control line 17. The three conditions which switch 16 is capable of providing on input line 17 are: connection to positive voltage; open circuit; and connection to ground.

When a connection to positive voltage 12 is made by the switch 16 connected to input line 17, transistor 22 is saturated. The saturation voltage at the collector-emitter of transistor 22 is very low. The positive voltage 12 seen at the input line 17 results in sufficient current flow through a forward biased diode 24 to energize a relay 26 when transistor 22 is saturated. Energized relay 26, through its normally open contact, provides electrical continuity between a clockwise (CW) terminal 32 of a motor 36 and positive voltage 12. The very low saturation voltage at the collector of transistor 22 keeps Darlington transistor 28 unsaturated by the voltage division formed by 100K ohm resister 38 and 2K ohm resistor 39 which maintains a second relay 30 in a deenergized or normally closed state. Relay 30, through its normally closed contact, provides electrical continuity between a counterclockwise (CCW) terminal 34 of motor 36 and ground 14. Clockwise rotation operation of the motor 36 results. Circuit parameters in this state are summarized in FIG. 2.

When switching means 16 is positioned so an open circuit condition is present at the input line 17, the base-emitter junction of transistor 22, again conducts, saturating transistor 22. The combination of 100K ohm resistor 18, 680 ohm resistor 20 and supply voltage 12 maintain current flow into the base of transistor 22 sufficient to keep transistor 22 saturated, again keeping the saturation voltage at the collector-emitter junction of transistor 22 very low. The low voltage on input line 17, keeps current flow through the forward biased diode 24 to the coil of the relay 26 negligible so that relay 26 remains deenergized or in the normally closed state. The very low saturation voltage at the collector of transistor 22 which is connected to the base of the Darlington transistor 28 through 2K ohm resistor 39, keeps the Darlington transistor 28 unsaturated, maintaining the second relay 30 in the deenergized or normally closed state. The normally closed status of relays 26 and 30, shorts the clockwise (CW) terminal 32 and the counterclockwise (CCW) terminal 34 of the motor 36 to ground 14 effecting dynamic braking operation of the motor 36, as summarized in FIG. 2. In this quiescent state, the high values of resistors 18 and 38 (100K ohms) are significant in limiting the current drawn from the DC supply to a very small value.

When a connection to ground 14 is made by the switch 16 connected to input line 17, no current flows into the base of transistor 22. Transistor 22 is unsaturated. No current flows through transistor 22, therefore relay 26 is deenergized and its normally closed state keeps the clockwise (CW) terminal 32 of motor 36 grounded. Transistor 22 being unsaturated enables the voltage at the base of the Darlington 28 to rise to a threshold voltage at which the base-emitter junction of Darlington transistor 28 is saturated. The current flow into the base of Darlington 28, established by 100K ohm resistor 38 is capable of fully saturating the collector-emitter junction of that transistor. Because of the Darlington's high gain characteristic, the saturation of Darlington 28 energizes relay 30. With relay 26 normally closed (connecting the CW terminal 32 to ground) and relay 30, through its normally open contact connecting the CCW terminal 34 of motor 36 to positive voltage 12, counterclockwise rotation operation of motor 36 is effected, as summarized in FIG. 2.

Switching the input line 16, at any time, to an open circuit condition as described above, results in dynamic braking of the motor 36. Two diodes 40, 42, suppress inductive transients generated by relays 26, 30 when either transistor 22 or Darlington 28 is turned off.

Although the circuit herein described is discussed in the context of general automotive accessory motor control, any application requiring maximally three modes of motor operation, such as power windows, power door locks, power mirrors, power seats and power antenna systems, might be suitable applications for this circuit. Additionally, modifications external to the circuit hereinbefore disclosed, may render the circuit useful in applications requiring less than three-states of motor operation where reduction in wire count and size and reduced switch complexity are desirable.

Alternative embodiments illustrate the flexibility of the circuit hereinbefore described. Modifications of the circuit permit a variety of combinations of relay conditions suitable for operating alternative loads, while retaining the single input control line and single power supply concept according to the invention.

Figure 3:
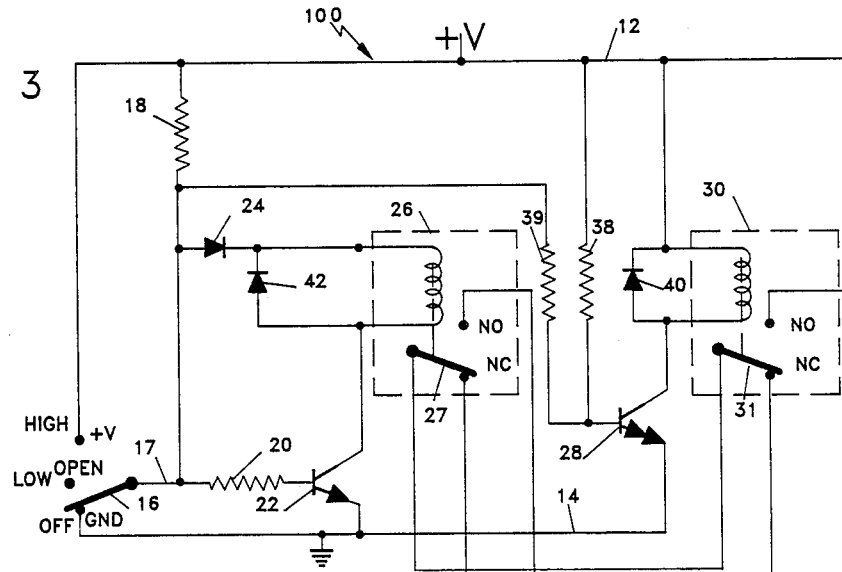
FIG. 3 is an alternative embodiment, according to the invention, for controlling a two speed, DC motor.
Figure 4:
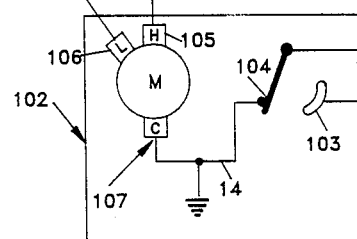
FIG. 4 is a table correlating input control line condition and circuit operation of the alternative embodiment of FIG. 3.

Referring now to FIGS. 3 and 4, by connecting 2K ohm resistor 39 to the input line 17, as in FIG. 3, rather than to the collector of transistor 22 as seen in FIG. 1, relays 26 and 30 will function (as in FIG. 4) differently (than as indicated in FIG. 2) with respect to the position of input switch 16. A windshield wiper motor control circuit 100 functions to control a wiper motor and cam-type park switch module 102 which constitutes a multi-terminal load, as known in the art, such that two speeds of wiper motor operation and self-parking of the wipers are the three-states of load operation controlled. The wiper motor and park switch module 102 comprises a cam-type park switch run position 103, a park position 104, a motor high speed terminal 105 and a motor low speed terminal 106. A common terminal 107 of the motor is at reference or ground potential 14.

In this embodiment, positioning switch 16 to connect input control line 17 to a positive DC voltage on line 12, results in transistor 22 being saturated by the current flowing through 680 ohm resistor 20. Sufficient current flows through forward biased diode 24 to energize relay 26 actuating its movable contact 27 to the normally open position. At the same time, sufficient current flows into the base of Darlington 28 through 100K ohm resistor 38 and 2K ohm resistor 39, to saturate that transistor and energize relay 30, actuating its movable contact 31 to the normally open position. The cam-type park switch actuated by the motor shaft and internal to the motor and park switch module 102, is connected at run position 103 to the positive D.C. voltage 12 and to the normally open contact of relay 30. With relays 26 and 30 energized, electrical continuity is effected through the normally open contact of energized relay 30 and through the normally open contact of energized relay 26 so that positive DC voltage is seen at a high speed [H] terminal 105 of the two-speed wiper motor of module 102. High speed wiper motor operation results, as summarized in the table of FIG. 4.

When switch 16 is positioned so an open circuit condition is present at the input line 17, transistor 22 becomes saturated. The open circuit condition on input line 17 results in negligible current flow through diode 24 keeping relay 26 deenergized and its movable contact 27 in the normally closed state. At the same time, the base of Darlington 28 sees sufficient current flow through resistors 18, 38 and 39 from the positive DC voltage on line 12, so that Darlington 28 is saturated. As a result of Darlington 28 being saturated, relay 30 is energized and its movable contact 31 actuated to the normally open position. Electrical continuity is effected through the normally open contact of relay 30 and through the normally closed contact of relay 26 so that the positive DC voltage 12 is seen at a low speed [L] terminal 106 of the two-speed motor of module 102. Low speed motor operation results when the input switch 16 is in this open circuit state, as summarized in the table of FIG. 4.

When switch 16 connects input line 17 to ground 14, the base of transistor 22 is at ground potential 14. The base of Darlington 28 is near ground potential because of the voltage divider formed by resistors 38 and 39. If the motor is not in the park position 104, the positive D.C. voltage 12 is applied to the low speed [L] terminal 106 of the motor and park switch module 102 through the run position 103 of the motor and park switch module 102 and the normally closed contacts of relays 26 and 30. As the motor rotates, the motor and park switch module 102 is moved to the park position 104, facilitating a connection to ground 14 of the low speed [L] terminal 106 of the motor and park switch module 102 through the normally closed contacts of relays 26 and 30. The wipers are in the park position and the motor in the motor and park switch module 102 is dynamically braked. Diodes 40 and 42 suppress inductive transients generated by relays 26 and 30 when either transistor 22 or Darlington 28 is turned off.

Referring now to FIG. 5, an exterior lighting control alternative circuit embodiment comprises a stage A and a stage B, which are cascaded and provide a plurality of modes of operation of a lighting load, utilizing a single input control line to each stage and a single DC power supply, according to the invention.

Stage A is wired much like the two speed motor control circuit of FIG. 3. The relays 26 and 30 function, as indicated in FIG. 5A, identically to those in FIG. 3 (as indicated in FIG. 4). However, relay 26 of FIG. 5 is driving stage B (which drives a lighting load 52) and relay 30 of FIG. 5 is driving a lighting load 50 directly, as opposed to the motor load being driven by the relays in FIG. 3. The lighting load 50, typically comprises automobile parking lamps, side markers and license lamps, as known in the art.

When switch 16 of FIG. 5 connects input line 17 to ground, transistor 22 and Darlington 28 are unsaturated therefore relays 26 and 30 are deenergized and in their normally closed state. The connection of input line 16 to ground corresponds to all exterior lighting being off, as indicated in FIG. 5A.

When switch 16 connects input line 17 to an open circuit, relay 26 is deenergized and in the normally closed state. Relay 30, however, is energized connecting the positive DC voltage 12 to the lighting load 50 resulting in illumination of the lighting load 50. The connection of input line 17 to an open circuit corresponds with a parking lighting mode of operation of the exterior lighting control embodiment, as indicated in FIG. 5A.

When switch 16 connects input line 17 to positive DC voltage, transistor 22 and Darlington 28 are both saturated. Darlington 28 energizes relay 30 which connects positive DC voltage 12 through the normally open contact, to the lighting load 50 resulting in illumination of the parking lighting load 50. Transistor 22 turning on, energizes relay 26 which results in the positive DC voltage being connected, through the normally open contact of relay 26, to various components of stage B as described hereinafter. This mode of switch connection corresponds with full lighting operation of the exterior lighting circuit embodiment and is summarized in FIG. 5B.

Stage B directly controls a dual beam headlighting load 52, as known in the art, and embodies a single input control line 56 and a single positive DC voltage according to the invention to effect three modes of head light operation: high beam; low beam and flash-to-pass.

Stage B, which is enabled by input switch 16 of stage A being connected to positive DC voltage 12, comprises a three position switch 54 connected to a single input control line 56. An NPN transistor 58 has its collector connected to a coil side of a relay 60. A PNP transistor 62 has its collector connected to a coil side of a second relay 64. The normally open contact of relay 60 is connected to a low beam filament line 66 while the normally open contact of relay 64 is connected to a high beam filament line 68 of the dual beam headlamps 52 and to a remotely mounted high beam indicator lamp 70 (normally mounted on a vehicle instrument panel).

When switch 54 is positioned so that a positive DC voltage is connected to input line 56, NPN transistor 58 is saturated by current flowing through 680 ohm resistor 72. Current flow through transistor 58 energizes relay 60 which connects a positive DC voltage 12, through its normally open contact, to the low beam filament line 66, lighting the low beams. Concurrently, PNP transistor 62 is off because its reverse biased base emitter will not conduct in this state. Consequently, relay 64 is deenergized and in the normally closed state.

Low beam lighting operation results, as indicated in FIG. 5B.

When input switch 54 is positioned such that ground is connected to input line 56, NPN transistor 58 will not be saturated and the lack of current flow will cause relay 60 to be deenergized and in the normally closed state. At the same time, PNP transistor 62 will be saturated by the current flowing through 680 ohm resistor 74, permitting sufficient current flow to energize relay 64 which will connect a positive DC voltage through its normally open contact to the high beam filament line 68. High beam operation results as summarized in FIG. 5B.

When switch 54 is positioned such that an open circuit is connected to input line 56, the voltage at the base of NPN transistor 58 is sufficient to turn that transistor on allowing sufficient current to flow to energize relay 60. The base-emitter junction of the PNP transistor 62 also begins to conduct turning that transistor on and permitting sufficient current flow to energize relay 64. The positive DC voltage is connected to the low beam filament line via the normally open contact of energized relay 60 and the positive DC voltage is connected to the high beam filament line 68 via the normally open contact of energized relay 64. Both high and low beams are illuminated effecting a flash-to-pass mode of operation. In the event that it is desired to energize both the high and low beam filaments of lighting load 52 with stage A switch 16 in the off or park position (connected to ground or open circuit respectively), switch 54 applies positive potential 12 to stage B when switch 54 is in the flash-to-pass position.

The circuits disclosed herein could be modified, as known in the art, to operate using different voltages than those indicated, or to operate using a negative DC power supply or positively grounded battery.

A three position switch is disclosed herein as providing the three conditions, (positive voltage, ground and open circuit) sensed by the circuit, however, any of several types of tri-state logic could be used in providing these conditions.

Transistors 22, 58, 62 and Darlington 28 effect switching functions in the circuit, but other switching devices, such transistor equivalent circuits could be substituted.

Although the invention has been shown and described with respect to an exemplary embodiment thereof, it should be understood by those skilled in the art that the foregoing and various other changes, omissions, and additions in the form and detail thereof maybe made therein without departing from the spirit and scope of the invention.

What is claimed is:

1. A circuit for controlling electric current flow to a plurality of terminals of a load in order to effect a plurality of modes of operation of said load, said circuit comprising:

a first conductor carrying a direct current potential with respect to a reference potential applied on a second conductor;

a single input control line;

input switching means selectively operable to alternatively connect said input control line to a first condition, a second condition or a third condition, respectively;

first switching means, responsive to said input switching means and having a movable contact, a first contact and a second contact, for normally providing electrical continuity between said movable contact of said first switching means and alternatively said first contact of said first switching means or said second contact of said first switching means;

second switching means responsive to said input switching means and having a movable contact, a first contact and a second contact, for normally providing electrical continuity between said movable contact of said second switching means and alternatively said first contact of said second switching means or said second contact of said second switching means; and electronic means operative in response to said input control line being connected by said input switching means to alternatively, said first condition, or said second condition or said third condition, said electronic means being determinative of electrical continuity between said movable contact of said first switching means and alternatively said first contact of said first switching means or said second contact of said first switching means, said electronic means further being determinative of electrical continuity between said movable contact of said second switching means and alternatively said first contact of said second switching means or said second contact of said second switching means whereby the condition on said input control line provided by said input switching means establishes, in conjunction with said electronic means, the state of said first and second switching means which effect a particular mode of operation of said load.

2. A circuit for controlling electric current flow to first and second terminals of a load, in order to effect a plurality of modes of operation of said load, said circuit comprising:

a first conductor carrying direct current potential with respect to a reference potential applied on a second conductor;

a single input control line;

input switching means selectively operable to alternatively connect said input control line to a first condition, a second condition or a third condition, respectively;

first switching means, responsive to said input control line, for normally providing electrical continuity between said first conductor and said first terminal of said load and alternatively providing electrical continuity between said second conductor and said first terminal of said load;

second switching means, responsive to said input control line, for normally providing electrical continuity between said first conductor and said second terminal of said load and alternatively providing electrical continuity between said second conductor and said second terminal of said load; and electronic means, operative in response to said input control line, for establishing first switching means electrical continuity between said first terminal of said load and alternatively said first conductor or said second conductor, said electronic means further establishing second switching means electrical continuity between said second terminal of said load and alternatively said first conductor or said second conductor.

3. The circuit of claim 2, wherein said input switching means is selectively operable to alternatively connect said input control line to: said first condition corresponding to connection to said first conductor; said second condition corresponding to connection to said second conductor or said third condition corresponding to connection to an open circuit.

4. The circuit of claim 3, wherein said first switching means provides electrical continuity between said first conductor and said first terminal, corresponding with said input control line being connected to said first conductor via said input switching means.

5. The circuit of claim 3, wherein said first switching means provides electrical continuity between said second conductor and said first terminal, corresponding with said input control line being connected via said input switching means to said second conductor and in the alternative to an open circuit.

6. The circuit of claim 3, wherein said second switching means provides electrical continuity between said first conductor and said second terminal, corresponding with said input control line being connected to said second conductor via said input switching means.

7. The circuit of claim 3, wherein said second switching means provides electrical continuity between said second conductor and said second terminal, corresponding with said input control line being connected via said input switching means to said first conductor and in the alternative to an open circuit.

8. The circuit of claim 3, wherein said load is a reversible DC motor capable of alternatively rotating in a first direction, rotating in a second direction or being dynamically braked.

9. The circuit of claim 8, wherein connection of said input switching means to said first conductor corresponds with motor rotation in said first direction and connection of said input switching means to said second conductor corresponds with motor rotation in said second direction and connection of said input switching means to an open circuit corresponds with said motor being dynamically braked.

10. A circuit for controlling electrical connection between current flow to a plurality of terminals of a multi-terminal load, effecting a plurality of modes of operation of said load, comprising:
a source of direct current potential applied on a first conductor with respect to a reference potential applied on a second conductor;
a single input control line;
input switching means selectively operable to alternatively connect said input control line to a first condition, to a second condition or to a third condition;
first switching means, responsive to said input control line and incorporating a movable contact, for normally providing a connection between said first switching means movable contact and a first terminal of said multi-terminal load and in the alternative providing a connection between said first switching means movable contact and a second terminal of said multi-terminal load;
second switching means, responsive to said input control line and incorporating a movable contact, for normally providing a connection between said second switching means movable contact and a third terminal of said multi-terminal load and in the alternative providing a connection between said second switching means movable contact and a fourth terminal of said multi terminal load; and
electronic means operative in response to said input control line being connected to alternatively said first condition, said second condition or said third condition, said electronic means causing electrical continuity between said movable contact of said first switching means and alternatively said first terminal of said multi-terminal load or said second terminal of said multi-terminal load, said electronic means further causing electrical continuity between said movable contact of said second switching means and alternatively said third terminal of said multi-terminal load or said fourth terminal of said multi-terminal load.

11. The circuit of claim 10, wherein said terminals are all of the same multi-terminal load which comprises a two speed wiper motor and park switch module in which said motor is operable alternatively in a high speed mode, in a low speed mode or in a dynamically braked mode and said park switch comprises a wiper, a run position and a park position.

12. The circuit of claim 11, wherein said first switching means movable contact is electrically connected to said second switching means movable contact and said first terminal is a low speed terminal of said two speed wiper motor, said second terminal is a high speed terminal of said two speed wiper motor, said third terminal is said park switch wiper and said fourth terminal is said park switch run position.

13. The circuit of claim 12 wherein said first condition corresponds with a connection to said first conductor, said second condition corresponds with a connection to said second conductor and said third condition corresponds with a connection to an open circuit.

14. The circuit of claim 13 wherein connection of said input switching means to said first condition corresponds with high speed wiper motor operation, connection of said input switching means to said second condition corresponds with dynamic braking of said wiper motor and connection of said input switching means to said third condition corresponds with low speed wiper motor operation.

15. A circuit for selectively connecting each of a plurality of electrical inputs to a variety of electrical outputs in response to a single input signal, comprising:
a source of direct current potential applied on a first conductor with respect to a reference potential applied on a second conductor;
a single input control line;
input switching means selectively operable to alternatively connect said input control line to a first condition, to a second condition or to a third condition;
a pair of output switching means each having a first contact and a pair of second contacts; and
electronic means connected with said input switching means and both of said output switching means for causing one of said output switching means to have its first contact connected to the same one of its second contacts in response to either said first condition or said second condition being connected to said input control line and to have its first contact connected to the other one of its second contacts in response to said third condition being connected to said input control line, and for causing the other of said output switching means to have its first contact connected to one of its second contacts in response to either said second condition or said third condition being connected to said input control line and to have its first contact connected to the other of its second contacts in response to said first condition being connected to said input control line.

* * * * *